United States Patent Office 2,858,430
Patented Oct. 28, 1958

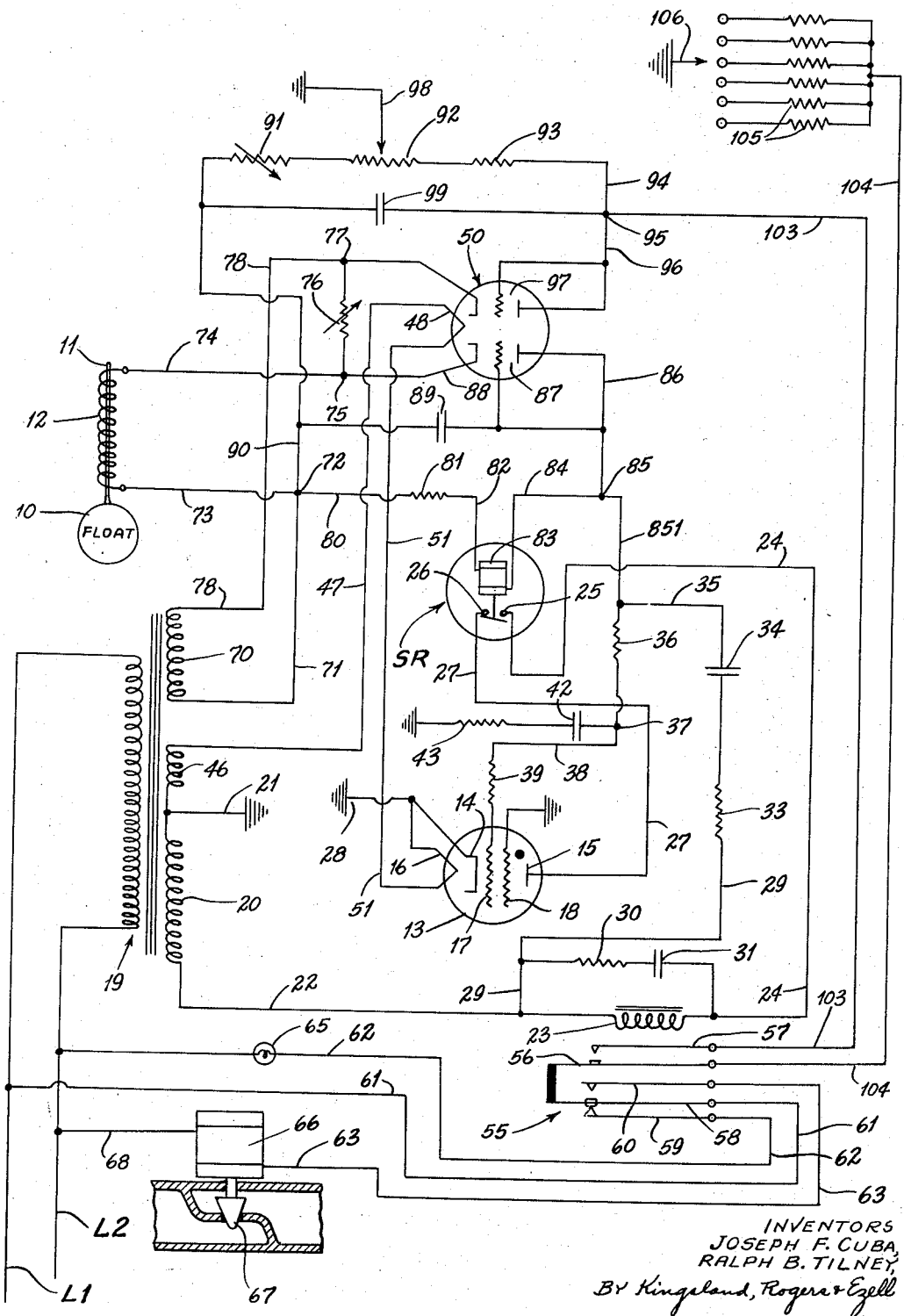

2,858,430

ELECTRONIC ON-AND-OFF CONTROL

Joseph F. Cuba, St. Louis, and Ralph B. Tilney, Clayton, Mo., assignors to Alco Valve Company, University City, Mo., a corporation of Missouri Application February 8, 1954, Serial No. 408,694

7 Claims. (Cl. 250—27)

The present invention relates to an electronic, automatic on-and-off control. It is a type of control such as that illustrated in Patent No. 2,629,826, issued to D. K. McIlvaine et al. on February 24, 1953, although features of the present disclosure may be used with other controls of similar nature.

This control, when used for example as a liquid level control, comprises an electronic tube and appropriate control circuits, to render the tube conducting when the liquid level falls to a presettable low, so that an inlet valve in the control output circuit may be energized to admit more liquid; and to render the tube and its output circuit non-conducting when the liquid level attains a presettable high so that the valve will be closed. The control of the tube is made by regulating its grid-cathode potential, there being an A. C. grid potential, and two D. C. grid potentials. The grid and cathode are connected across between mid-positions of two D. C. circuits so as to derive potentials from each. One such circuit has a potential that varies with the position of the float. The other has an adjustable potential varying means so that it may be selectively varied—and hence may vary the float position at which the net potential is such as to render the tube conductive.

A particular object of the present invention is to provide a control of this type having certain safety features, and, in particular, to provide a control having safety features in the event of power failure, short circuit of the pick-up coil, tube filament burn-out, open taps on the transformers, or short circuit taps on the transformers. It is also an object of the present invention to provide such a control which will fail safe in the event the pick-up coil is open, or in the even a tube cathode opens, or a grid circuit opens, or a tube is weak.

The details of these and other fail-safe features, as well as other desirable characteristics of the present invention, will appear more fully from the description to follow.

The drawing is a schematic wiring diagram of a form of circuit involving the present invention.

The control is illustrated for use in connection with apparatus to maintain a liquid level of a liquid container within predetermined maximum and minimum limits. To this end, there is a float 10 that moves up and down with changes of liquid level in the vessel to be controlled. Preferably, the float 10 has a characterized armature 11 upstanding therefrom and reciprocating within an induction coil 12, as illustrated in Patent No. 2,629,826 of D. K. McIlvaine et al. The characterizing of the armature 11 is to give a substantially linear increase in impedance, and hence reduction in current flow through the coil 12, as the float rises.

The rise and fall of the float, and consequently changes in impedance in the coil 12, are designed ultimately to render a thyratron tube 13 conductive and non-conductive. This thyratron tube may be a GL502A. It is provided with a cathode 14 and plate 15. The cathode has a heater 16. There are two grids 17 and 18. When the tube is conductive, its output circuit between the plate and cathode will be energized from a transformer 19, and more particularly from a secondary 20 thereof. One end 21 of the secondary 20 is grounded. The other connection 22 from the secondary leads through a relay coil 23, and thence by way of a line 24 to a switch terminal 25 of a safety relay SR. The other switch terminal 26 of this relay is connected by a wire 27 to the plate 15 of the tube. The cathode 14 of the tube is grounded at 28.

A wire 29, connected into the transformer lead wire 22, leads to a branch consisting of a resistance 30 and capacitance 31 that are connected in series across the relay coil 23. This branch circuit keeps the coil 23 energized during the half cycle that the thyratron cannot conduct. There is also an A. C. grid biasing feedback circuit leading from the line 22 through the wire 29 to a resistor 33, a capacitor 34, and thence by a wire 35 into a circuit leading to the grid 17. The capacitor 34 is connected by the wire 35 through a resistor 36 to a terminal 37. Thence, a wire 38 leads to another resistor 39 that is connected to the grid 17. This feedback circuit is completed through the cathode and ground, back to the ground wire 21 of the secondary 20. The terminal 37 is connected through a capacitor 42 and resistor 43 to ground, to avoid parasitic circuits derived from this feedback circuit.

There is a low voltage secondary 46 in the transformer 19 which is grounded at 21. This secondary 46 is provided for tube heater elements. Its other end is connected by a wire 47 leading into a heater 48 of a rectifier tube 50, later to be described. The other side of the heater 48 is connected by a wire 51 with the thyratron tube heater 16 that is connected to the ground 28.

The coil 23 in the output circuit of the thyratron 13 operates a multiple switch device 55. In this switch device there is a normally lowered spring blade 56 that may be brought into contact with another spring blade 57 when the coil 23 is energized, but which springs away from that contact when the coil 23 is released. The switch 55 also includes a spring blade 58 that normally springs downwardly into contact with a lower blade 59, but which, when the coil 23 is energized, breaks with the blade 59 and makes with an upper contact 60.

The blade 58 is connected with a wire 61. The lower blade 59 is connected with a wire 62, and the upper blade 60 is connected with a wire 63.

The wire 61 is shown as connected to one of the A. C. power lines L1 leading to the primary of the transformer 19. The wire 62 is connected through a signaling device 65 to the other power line L2. The signaling device may be used when it is desired to indicate the times that the output circuit is deenergized. The wire 63 is connected through the coil 66 of a valve 67. The other end of the coil 66 is connected by a wire 68 to the other power line L2. It will be seen that when the coil 66 is energized the valve 67 will be open and liquid may flow past the valve to recharge the container with liquid. When the coil 66 is released, the valve 67 will close.

The following description will relate to the components of the control of the tube 13, which render it conducting and non-conducting, and hence determine the conditions under which the valve 67 will be opened and closed.

There is an additional, median-voltage secondary 70 of the transformer 19. One lead 71 from this transformer leads to a junction 72. From the junction, a wire 73 leads to the coil 12. The other end of the coil 12 is connected by a wire 74 to a junction 75. From this junction the circuit continues through a variable resistor 76 to a junction 77. The wire 78 leads from the junction 77 back to the secondary 70. By this arrangement there may be a continuous circuit through the pick-up coil 12 (which, being responsive to the position of the float 10, constitutes the sensitive element of the apparatus) and the resistor 76. In the circuit the current flow varies with the position of the float 10 and its armature 11 within the coil 12. As a result of the current variation aforesaid, potential drop across the resistor 76 will also vary as a function of the position of the float.

Also, from the junction 72 in the wire 71 a wire 80 leads to a resistor 81. From the resistor a wire 82 leads to one end of an actuating magnetic coil 83 of the safety relay SR. From the other end of the coil 83 a wire 84 leads to a junction 85, whence a wire 86 leads to one plate of one side 87 of the dual rectifier 50, the cathode of which is connected by a wire 88 to the junction 75. A condenser 89 is connected across the grid and the cathode of the rectifier 87, as illustrated, to smooth out the unidirectional current flow through the rectifier.

The significance of the foregoing circuit branch is that the rectifier current through the resistor 81 is directly proportional to the voltage drop across the coil 12, both branches being fed through the first or series resistance 76. The current through the resistor 81 is also fed through the safety relay coil 83 for a purpose to appear. And a wire 851 from the junction 85 connects these circuit branches into the resistor 36 and hence into the Thyratron grid circuit in a manner later to be explained.

Another circuit from the secondary 70 leads from the terminal 72. It includes a wire 90 that enters a multiple series resistor 91, 92 and 93. At least one of these resistances is variable, the resistance 91 being here so illustrated. The other end of the resistor 93 leads by a wire 94 to a junction 95. From the junction 95 a wire 96 leads to the plate of the other side 97 of the dual rectifier 50. The cathode of this rectifier 97 is connected to the junction 77 so that this circuit may be completed by the wire 78, and may continuously receive potential from the secondary 70, and hence may be continually conductive unidirectionally. A capacitance 99 is connected across the resistance group 91, 92, 93, so as to aid in smoothing out the current flow.

The resistance 92 has an adjustable contact 98 that is grounded. By this arrangement variable portions of the resistance 92 may be connected through the lead 98 to ground. Since the cathode 14 of the tube 13 is grounded, the effect of the lead 98 is to connect the cathode to the presettable midpoint of the resistor 92.

From the junction 95 a wire 103 leads to the switch contact 57. The other switch contact 56 is connected by a wire 104 which leads to a group of parallel resistors 105 which have various resistance values. A selected one of these resistors may be connected to the adjustable lead 106 that is grounded, so that a selected amount of resistance may be brought into circuit.

*Operation*

The apparatus is connected as indicated in the drawing. The float 10 is located in the liquid container that is supplied through the valve 67. The variable resistances are adjusted as will be explained.

When the primary of the transformer is energized, the secondary 46 will heat the filaments of the dual rectifier and the thyratron. The secondary 20, typically 115 volts, will apply A. C. potential to the plate or output circuit of the tube 13, and also to the grid-cathode. This A. C. grid potential component is phased by the circuit elements so as to cause the tube to fire (i. e., being conducting) at the beginning of an A. C. output potential cycle. While the D. C. grid potential controls are hereafter described apart from the A. C. grid potential, it will be understood that the actual grid potential is the net of the A. C. and D. C. elements.

Considering the D. C. grid control, the secondary 70 is the source of several continuously energized circuit branches wherein there is current flow. Typically, the voltage of this secondary may be 30 volts. Its circuits branch off from its two terminals 72 and 77 and include: (1) the terminal 72, the sensitive element coil 12, the junction 75, the resistance 76, and the terminal 77 to constitute an A. C. circuit; (2) the terminal 72, the resistance 81, the safety relay coil 83, the terminal 85, the lower rectifier 87, the junction 75, the resistance 76, and the terminal 77, to constitute a rectified A. C. circuit; (3) the terminal 72, the resistance group 91, 92 and 93, the upper rectifier 97, and the terminal 77 to constitute another rectified A. C. circuit. The several condensers connected across certain of these impedances and rectifiers are to smooth out the unidirectional potentials.

The foregoing constitutes a network in which two power lines are connected through two parallel, impedance-containing circuits. The first such circuit comprises first two parallel impedance sub-groups between the power line terminal 72 and the intermediate junction 75, after which the junction 75 is connected to the other power line terminal 77 through resistance. The second such parallel circuit includes the resistance group 91, 92 and 93 and the rectifier 97. The second circuit is tapped into at the ground connector 98, which is separated from both power line terminals by impedances.

The grid-cathode of the tube 13 are put across between the junction 85 of the first parallel grid control circuit and the adjustable midpoint 98 of the resistor 92 of the second parallel grid control circuit. The effect is to apply a D. C. grid-cathode potential between the grid 17 and the cathode 14, the direction and amount of which depend upon the voltage level at the point 85 and the voltage level at the contact point 98 in the resistor 92. Assuming point 72 positive with respect to junction 85, the voltage level at 85 relative to the point 72 has a potential that is a function of the voltage drop across the parallel sub-circuit that is disposed between the junctions 72 and 75. Assuming that neither the impedance 12 nor the combination of resistance 81 and coil 83, and the resistance at 76, are too greatly different, then variation in the position of the float so as to increase the impedance of the coil 12 (i. e., the float rises introducing more iron into the coil 12), will lower the voltage at 75. This means that there will develop a greater voltage drop between junctions 72 and 75, and hence a lower voltage at 85 relative to point 72, as a result of this increase of impedance in the sensitive element 12.

With the arrangement indicated in the drawing, the voltage at the contact point 98 in the second grid control circuit is predetermined by adjustment. That is to say, the potential at this point is adjustable by positioning of the ground contact 98 or by adjustment of the resistance 91. Consequently, the point 98 may be given a potential relative to the point 85 such that the total range of variation of the float can drive the grid-cathode potential of the tube 13 from negative to positive, as will appear. The tube 13 will conduct so long as the potential is not negative.

As soon as the tube 13 becomes conductive, it energizes the relay coil 23 and pulls the switch 55 upwardly. When the switch 55 is pulled upwardly, the contacts 56 and 57 are closed together, which puts a selected one of the resistance group 105 across in parallel with the latter part of the resistor 92 and the resistor 93, thus lowering the voltage drop across that group by an amount determined by the selected resistance 105. This will increase the voltage drop from the point 72 to the point 98. In other words, it will lower the potential at the point 98 relatively to the potential at 72, thus tending to drive the cathode 14 more negative with respect to the grid 17.

If the voltage drop from the point 72 to the point 85 is greater than the drop from the point 72 to the point 98, the grid will be negative with respect to the cathode in an amount depending upon the difference in those two potentials. Conversely, if the potential drop between the point 72 and the point 85 is less than that from the point 72 to the point 98, the grid will be positive with respect to the cathode in an amount depending upon the difference.

The controls are initially calibrated so that when the float descends to a predetermined low position while the tube 13 is non-conducting, the grid will be changed from negative to neutral with respect to the cathode, at which point the tube will conduct. The particular position of the float at which this occurs is determined by adjustment of the resistance 91 or the tap 98, to bring the potential of the point 98 to that of the point 85 when the float attains the desired low point.

As noted, when the coil 23 is energized by conduction of the tube 13, the resistance 105 is added as a parallel leg to the lower part of the second grid control circuit, immediately lowering the potential at point 98 relatively to the point 72, and driving the cathode much more negative—and the grid much more positive.

When the coil 23 is energized, the switch plate 58 opens the contact 59, thereby deenergizing the signal 65, and it closes with a contact 60, thereby opening the valve 67 and admitting liquid to the container where the float is located. Thereupon, the float begins to rise. As it rises, it increases the impedance of the coil 12 and drives the relative potential of the point 85 downwardly, thus making the grid increasingly less positive.

Finally, the float will rise to such a position that the point 85 and the grid 17 becomes slightly negative with respect to the point 98. When the grid 17 is thus driven negative, the tube 13 becomes non-conductive and the coil 23 is deenergized. Deenergization of the coil 23 causes the valve 67 again to reclose, shutting off the inflow of liquid. It also reenergizes the signal 65; and it takes the resistance group 105 out from its parallel connection around the resistance 93. Consequently, the potential of the point 98 again goes up with respect to the point 72, and the cathode becomes more positive with respect to the grid. The grid 17 thereupon will not be driven neutral or positive until the liquid level in the tank has been lowered to the previously mentioned low point.

From the foregoing, it will be seen that the low point of the float at which the valve is opened is predeterminable by adjustment of the resistance 91; and the range of operation of the float and hence the high point of the float at which the valve is closed, is a function of the position of the adjustable contact 106 on the resistance group 105.

In the foregoing operations, the impulses of the rectified voltages are smoothed out by the illustrated capacitors, et cetera, as is self-evident.

The safety relay SR includes the coil 83, which is in series with the resistance 81 and one branch of the parallel network between the points 72 and 75. This coil 83 is thereby energized whenever the circuit is completed from the point 72 to the point 75, through the resistance 81 and the rectifier 87. This safety relay is designed to add certain safety factors not found in former circuits of a similar nature.

It will be observed that certain safety features are otherwise implicit in the circuit. They may be mentioned as follows. Upon power failure, the contacts 58 and 60 are left open because they are normally open contacts. This means that the valve 67 is closed on power failure. If the sensitive element coil 12 short circuits, the contacts 58 and 60 will remain open. In this condition, full transformer voltage is across resistor 76. Section 87 of tube 50 becomes inoperative as plate and cathode have the same potential. Section 97 of the tube 50 has not changed. Transformer voltage is then applied to the grid of the Thyratron 13 and phase relationship will cause the control to fail safe. If the tube filament burns out so that the tube 13 is not heated, the control will fail safe because the relay 23 will not be energized. If the transformer secondary 20 or 46 has an open tap, the control will fail safe because an open tap on the transformer 20 leaves the output circuit of the tube 13 open, and an open tap on the transformer 46 leaves the heater circuit open so the tubes do not become conductive. Similarly, a short circuit of either transformer provides for failing safe with the valve 67 closed.

The relay SR is employed to overcome some unsafe possibilities. If the sensitive element coil 12 is taken out of circuit, as by a broken connection, it is possible for the output circuit to be energized, since this may drive the potential at point 85 downwardly but not enough to make the grid 17 negative with respect to the point 98. In this condition, section 97 of tube 50 remains the same, but section 87 now has full transformer voltage across from plate to cathode, whereas previously only voltage drop across coil 12 was being rectified in section 87.

Another point of possible failing unsafe is at the cathode side of the rectifier tube 87. If the cathode circuit opens, the grid 17 will be driven very positive with respect to the cathode 14, since the grid 17 will assume the potential at 72. This will mean that the output circuit will be closed with such failure. (A similar break in the cathode circuit of the rectifier 97 will cause a safe failure because it will drive the cathode very positive with respect to the grid, assuming that the rectifier 87 remains operative.)

Another potential source of unsafe failing lies in the transformer 70. If it has an open tap, the grid 17 and cathode 14 will be at the same potential so that tube 13 may conduct. This causes the valve to be open and represents the unsafe condition. If the transformer 70 has a short circuit, there similarly will be equal potentials on the grid and cathode and consequent unsafe conditions.

Another point of possible unsafe failure is in the grid circuit of the tube, since the tube conducts unless the grid is driven negative. A break in the grid circuit will permit the tube to conduct and would represent an unsafe failure.

Another point of weakness lies in the rectifier 87. If it becomes weak and relatively non-conductive, the effect will be to drive the potential at 85 upwardly, rendering the grid 17 positive so that tube 13 conducts.

The safety relay SR overcomes many of the above unsafe features. For example, in the illustrated arrangement, if the sensitive element coil 12 is opened, it is equivalent to infinitely raising the resistance of that branch of the circuit, which drives the potential of the point 85 down relative to the point 72 and hence the grid 17 may become very negative so as to render the tube non-conductive.

If the circuit to the cathode of the rectifier 87 should open, that circuit branch, including it and the coil 83, becomes non-conductive so that the contacts 26 and 25 are not closed by the switch operated by the coil 83. Hence, the output circuit remains open and the relay coil 23 deenergized. Further, if the transformer 70 has a lead open or is short circuited, the coil 83 will not be energized or will be insufficiently energized to close its relay switch, and the output circuit will remain open. Also, if there be a weak rectifier 87 of low conductivity, the current through the coil 83 will be insufficient to close its switch and the output circuit will remain open. If there be a failure of the safety relay coil, such as a break or a short circuit, its switch will remain open and the output circuit will remain open. A similar result will follow a short circuit of the coil 83.

The foregoing fail safe conditions are based on the assumption that the tube is rendered conductive when the float reaches a low point. It is also assumed that no damage results to the equipment with the output relay contacts open, as aforesaid. This particular safety feature is not recommended as a control wherein the tube is rendered non-conductive when the float reaches a high point. However, it is evident that a much improved control has resulted. By transposing the coil 12 and the resistor 76, the operation of relay 55 is reversed, which reverses the action of the relay with respect to the action of the float, but maintains the fail safe conditions previously described.

What is claimed is:

1. In a control mechanism: an electronic tube having a cathode, a grid, and a plate; an output circuit including the cathode and plate; a grid potential control circuit means including first and second power lines; a first circuit having first and second impedances in series across the power lines, one of them comprising a sensitive element having means to vary its impedance in response to predetermined changes to be controlled; a unidirectional current, parallel circuit branch having a third impedance connected across the first impedance; a third resistance means connected in a second unidirectional current circuit parallel with the first circuit; a grid potential branch including the grid and cathode connected from an intermediate point of the first circuit to an intermediate point of the second circuit, the said intermediate points providing impedance to each power line; and variation in impedance of the sensitive element varying the potential of one end of the grid potential circuit so that the tube, and hence the output circuit, may be made conductive or non-conductive in response to the condition of the impedance of the sensitive element; and means operated by the power in the power lines of the grid potential circuit means to render the output circuit conductive, responsive to abnormal decrease of power in the power lines to below a predetermined amount, to prevent the output circuit from being made conductive, independently of the grid potential.

2. The combination of claim 1, wherein the last-named means comprises a relay device having one part responsive to amount of energy in the power lines, and another part operated by the first part to hold the output circuit closed only when such energy is above a predetermined amount.

3. The combination of claim 1, wherein the sensitive element impedance comprises an inductance coil, and wherein there is a control element movable into and out of the inductance coil to vary the impedance thereof in accordance with the position of the control element.

4. In a control mechanism: an electronic tube having a cathode, a grid, and a plate; an output circuit including the cathode and plate and an energizable device, the tube being conductive when the grid-cathode potential is equal to or greater than a predetermined amount; a grid potential control network including two alternating current power lines, a first circuit having therein a first and a second impedance in series, one of which is an induction coil with an element movable into and out thereof in response to predetermined changes to alter the impedance thereof, and the first circuit also including an impedance and a rectifier in parallel with the first impedance, connected to a junction between the first two impedances; a second circuit including first impedance means from the first power line and parallel second and third impedances from a junction point with that first impedance to the second power line, with a rectifier for all said second circuit, the grid-cathode being connected from the junction in the first grid control circuit to the junction in the second grid control circuit, whereby the grid potential will be determined by the relative voltage levels of the two junctions; and relay means having a relay operating device connected with the first grid control circuit and responsive to existence of normal current flow through the rectified branch of the first grid control circuit to close a relay switch in the tube output circuit.

5. In a liquid level control for a liquid container wherein a valve is opened when the liquid level lowers to a predetermined minimum and is closed when the level rises to a predetermined maximum: the combination of a float device movable with changes in liquid level; an inductance coil into and out of which the float device moves, which movement increases and decreases the impedance of the coil; a tube having a cathode, a grid, and a plate; an output circuit including the cathode and the plate; grid circuit means including opposite power lines, the inductance coil, the grid, the cathode, and impedance means, the grid circuit means having said components arranged to drive the tube non-conductive and conductive respectively when the float reaches its extreme positions; and means in the grid circuit means responsive to absence of a predetermined current flow therein, to open the output circuit.

6. In a control mechanism: an electronic tube having a cathode, a plate, and a grid; an output circuit means for the tube including the cathode and the plate, the tube being conductive when the grid potential is driven to a predetermined value in one direction and non-conductive when the grid potential is driven beyond that predetermined value in the opposite direction; grid-cathode circuit means including a first terminal at a predetermined voltage level and a second terminal at variable voltage levels with respect to the first; variable-potential circuit means into which the grid-cathode circuit means is connected, to vary the voltage level of the second terminal of the grid-cathode circuit means relative to the first, so as to vary the direction of potential of the grid-cathode to render the tube conductive and non-conductive; sensing means having variable impedance connected with the variable-potential circuit means to vary the voltage drop thereof and thereby to adjust the voltage level of the second terminal of the grid-cathode circuit means; and relay-switch means having its relay-switch operating element energized in accordance with the current flowing in the variable-potential circuit means, and its switch in a circuit that, when open, prevents current flow through the output circuit, the operating element being of a capacity to close its switch only when a predetermined current flows in the variable-potential circuit.

7. The combination of claim 6, wherein the tube is conductive when the grid potential is zero and is in one direction beyond zero; and wherein the voltage level of the second terminal of the grid-cathode circuit means is made zero or beyond, with respect to the first terminal, by the variations of the sensing means; and wherein the relay operating element closes its switch only when the potential of the second terminal is beyond zero in the said one direction by a predetermined amount.

References Cited in the file of this patent

UNITED STATES PATENTS

| 1,955,352 | Wallace | Apr. 17, 1934 |
| 2,447,497 | Devaux | Aug. 24, 1948 |
| 2,629,826 | McIlvaine | Feb. 24, 1953 |